United States Patent [19]
Vetter

[11] 3,875,671
[45] Apr. 8, 1975

[54] DEVICE FOR SENSING THE OUTER DIMENSIONS OF NON-ROUND WORKPIECES

[75] Inventor: Ulrich Vetter, Stuttgart-Heumaden, Germany

[73] Assignee: Schaudt Maschinenbar GmbH, Stuttgart-Heumaden, Germany

[22] Filed: Aug. 23, 1973

[21] Appl. No.: 391,014

[30] Foreign Application Priority Data
Sept. 8, 1972 Germany............................ 2244161

[52] U.S. Cl............................. 33/174 Q; 33/169 R
[51] Int. Cl. ...................... B23f 23/08; B23q 17/04
[58] Field of Search .......... 33/174 L, 174 Q, 169 R, 33/169 C, 172 E, 172 D, 172 R, 172 B

[56] References Cited
UNITED STATES PATENTS
1,928,457  9/1933  Mershon et al. ................. 33/172 E
2,691,887  10/1954  Rinker............................. 33/174 Q
3,245,148  4/1966  Whitney........................... 33/174 L FOREIGN PATENTS OR APPLICATIONS
615,024  1/1961  Italy................................. 33/174 Q

*Primary Examiner*—Harry N. Haroian
*Attorney, Agent, or Firm*—Bruce & McCoy

[57] ABSTRACT

An apparatus for gauging one extreme dimension of a non-round workpiece comprised of a sensing arm which activates a measuring feeler mechanism disposed to disengage from said sensing arm at a predetermined excursion thereof whereby total disengagement can be achieved if and when a predetermined dimensions is achieved, and a releasable locking means for maintaining said sensing arm in its disengaged position.

6 Claims, 2 Drawing Figures

3,875,671

DEVICE FOR SENSING THE OUTER DIMENSIONS OF NON-ROUND WORKPIECES

BACKGROUND OF THE INVENTION

1. Field of the Invention

The present invention relates to measuring devices and more particularly to an apparatus for gauging one extreme dimension of a non-round workpiece.

2. Description of the Prior Art

Devices for sensing the outer dimensions of workpieces have been developed which either between grinding intervals or during the actual grinding measure the actual dimensions of the workpiece during the course of the machine operation. As soon as the desired dimension is achieved the grinding procedure is terminated. However, such prior art devices are designed to measure round workpieces to be ground and for this purpose are usually provided with a sensing arm which is continuously pressed onto the workpiece and adapted to actuate a measuring feeler. Normally, two sensing arms are arranged to cancel out spurious measurements caused by displacement of the reference point of the measuring device relative to the workpiece.

Such two arm devices have also been adapted to sense the dimensions of non-round workpieces having certain profile characteristics. One such device, used in the grinding of so called PC 4 profiles, operates on a separate storing system whereby the circle to be described and the previously described circle are separately stored. However, these prior art devices are limited in use and are not suitable for the sensing of the outer dimensions of camshafts because the measuring accuracy obtainable is limited by the extent of the deviation from the base circle which is encountered. This deviation is small in the PC 4 profile, but with a greater cam lift a larger measurement excursion is required thereby reducing the capability of sensing to very close tolerances.

Other measuring devices are known which utilize a measuring feeler actuated by a sensing arm, but these devices are designed for special cases and are subjected to the same limitations relative to measuring accuracy as the previously described devices, and are therefore likewise not suitable for the sensing of the dimensions of cams. Typically, round workpieces are to be ground to much closer tolerances than cams. However, even cams are to be ground to tolerances smaller than thermal expansions and contractions of the grinding machine. Such expansions and contractions occur comparatively slowly and thus the standard procedure for compensating for them is to interupt the grinding process and manually check a cam of each camshaft and to readjust the grinding machine as soon as a cam (or two or more successively measured cams) are found to be close to tolerance limits. Of course, this is a very tedious operation and requires much operator skill; therefore it would be desirable to measure the camshaft during the actual grinding process. The problem of achieving suitable measuring accuracy during the grinding of camshafts is overcome by the present invention by providing an apparatus for gauging one extreme dimension of a non-round workpiece which disengages from the feeler mechanism at a predetermined point whereby the measuring accuracy is not adversely affected by the necessity of following the extreme lift of the cam.

SUMMARY OF THE INVENTION

The present invention is an apparatus for gauging one extreme dimension of a non-round workpiece comprised of a sensing arm urged by a spring means to sense the contour of a non-round workpiece. The sensing arm activates a measuring feeler mechanism and is predeterminely disposed to disengage from this measuring feeler at a predetermined dimension of the workpiece whereby disengagement can be achieved if and when the actual dimension of the extreme dimension of the workpiece exceeds a desired value. A releasable locking means is provided for maintaining the sensing arm in this disengaged position and also for separating the sensing arm from the workpiece upon the sensing arm reaching a maximum excursion.

OBJECTS OF THE INVENTION

It is therefore an important object of the present invention to provide an apparatus for engaging one extreme dimension of a non-round workpiece which can accurately sense the extreme dimension of a cam on a camshaft without loss of accuracy such as due to excursions of the sensing arm on the lifting portion of the cam.

It is another object of the present invention to provide an apparatus for gauging one extreme dimension of a non-round workpiece wherein the sensing arm is adapted to separate from the workpiece at a position corresponding to the greatest lift of the workpiece profile.

It is a further object of the present invention to provide an apparatus for gauging one extreme dimension of a non-round workpiece which does not continuously wear on the workpiece surface whereby said surface is prevented from wear due to contact by the measuring device.

It is still another object of the present invention to provide an apparatus for gauging one extreme dimension of a non-round workpiece wherein the sensing arm can be maintained in a position of separation from the workpiece until such time as it is released to re-engage the workpiece surface.

It is still a further object of the present invention to provide an apparatus for gauging one extreme dimension of a non-round workpiece wherein intermediate transmission levers can be provided for increasing the measuring accuracy of the apparatus according to the tolerances required.

And it is yet another object of the present invention to provide an apparatus for engaging one extreme dimension of a non-round workpiece wherein greater deflections of the sensing arm which may be demanded by the workpiece do not adversely effect the accuracy of the apparatus.

DESCRIPTION OF THE PREFERRED EMBODIMENT

Figure 1:
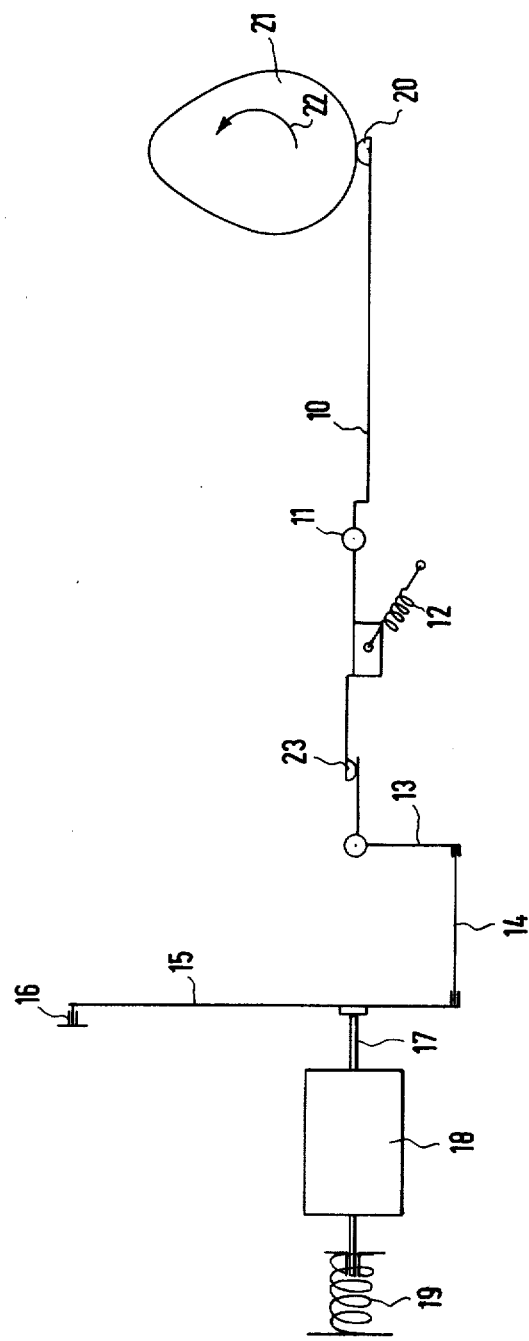
FIG. 1 is a schematic presentation of the apparatus according to the present invention.

Described hereinbelow is an apparatus which accurately senses the outer dimensions of a non-round workpiece and is specifically designed for the grinding of cams on a camshaft. The apparatus incorporates a sensing arm which actuates a sensing or measuring feeler mechanism at only one extreme dimension of the workpiece, such as at the base diameter of a cam profile. Outside this extreme dimension the sensing arm disengages from the measuring feeler so that the latter need not interpret the whole deflection of the sensing arm as the sensing arm follows the lift of the cam on the camshaft. The sensing arm is urged by a spring means against the camshaft until it reaches its maximum excursion, that is, the greatest deflection caused by the greatest lift in the cam profile, whereupon the sensing arm separates from the cam surface. Thus, after one rotation of the workpiece the sensing arm according to the present invention remains removed from the work piece in an inoperative state until a renewed sensing is desired at which time a suitable signal is transmitted releasing the sensing arm from its separated position to re-engage the workpiece.

To effect separation of the sensing arm from the workpiece a rocker element is provided which is urged against a cam disc secured to the sensing arm. As the rocker element slides along the cam disc with an excursion of the sensing arm, it counteracts the force of the spring urging the sensing arm against the workpiece. In this manner the sensing arm can follow a positive excursion of the workpiece, such as a cam, to rotate to a maximum lift, but cannot follow a negative excursion as the cam surface adjacent the sensing arm recedes to the base diameter. Only when the rocker element is raised from the cam disc can the sensing arm fall back into position on the workpiece.

Referring now to the drawings, sensing arm 10 is pivotally mounted at 11 and comprises one arm of a two armed lever which is urged about the pivot 11 by spring means 12 in a counter-clockwise direction. As sensing arm 10 rotates about pivot 11, it actuates a measuring feeler mechanism comprised of plunger 17, measuring box 18 and spring 19 disposed to urge the plunger into contact with intermediate lever 15. The sensing arm contacts, through support pad 20 the cam which, for example, rotates in the direction shown by arrow 22. In the position shown in FIG. 1, the support pad 20 is contacting the circumference of the base diameter of cam 21 and in this position presses through its pivotally opposite arm support pad 23 on intermediate lever 13. Intermediate lever 13 in turn transmits this force to intermediate arm 15 through connecting rod 14 and this latter intermediate lever transmits the force to plunger 17 which activates the measuring box 18 against the action of spring 19. If the cam 21 is rotated from the position shown in FIG. 1, the cam lift causes the sensing arm 10 to rotate in a clockwise direction against the restoring force of spring 12. As the sensing arm tends to leave its contact at support 23, spring 19 forces plunger 17 further to the right to pivot intermediate lever 13 in a counter-clockwise direction at 24 via intermediate lever 15 and connecting rod 14. The pivoting action of intermediate lever 13 will occur until the maximum path of plunger 17 is reached. If the sensing arm is pivoted beyond this point by further lift of the cam, intermediate lever 13 will disengage from support 23 thereby removing connection between the sensing arm and the measuring box. The sensing arm may continue to experience greater excursions without the measuring feeler mechanism having to be designed for a correspondingly large excursion.

Figure 2:
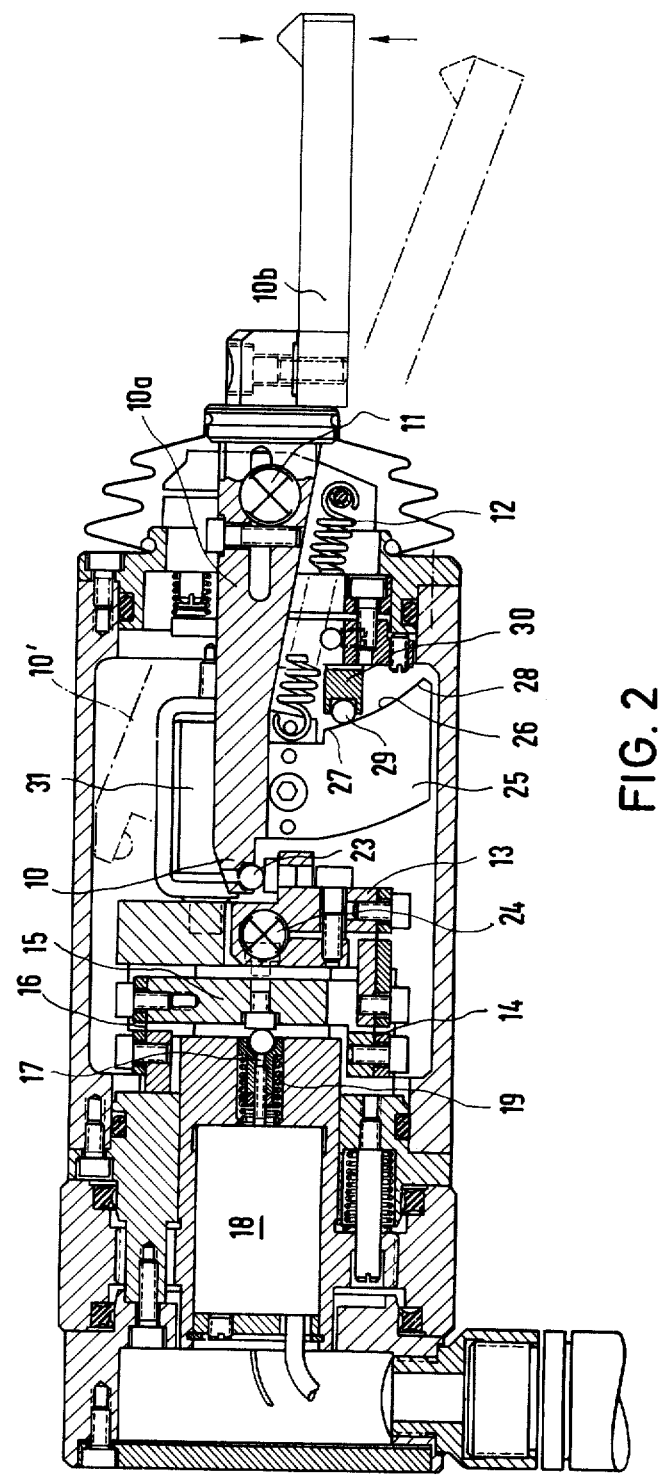
FIG. 2 is a cross-sectional view of the present invention shown in side elevation.

A practical construction of the preferred embodiment is shown in FIG. 2 wherein the sensing side of the sensing arm is indicated by 10b and the side of the sensing arm which engages the measuring feeler through intermediate levers 13 and 15 is indicated by 10a. These arms are separable so that it is possible to conveniently select different lengths of the sensing arm 10b according to the requirements of the object to be sensed without having to alter any other part of the device. This feature also allows the sensing arm 10b to be easily exchanged in case of wear on the support pad 20.

Pivot 11 of the sensing arm 10 and pivot 24 of the intermediate lever 13 are formed of cross-spring joints in order to eliminate any play in the levers during operation. For this same purpose, intermediate lever 15 is mounted by leaf spring 16.

Cam disc 25 is mounted on arm 10a of the sensing arm to project downwardly therefrom and is provided with a curved bearing surface 26 eccentrically disposed relative to the pivot 11 of the sensing arm such that the distance between the pivot and the curved surface 26 gradually increases from upper end 27 to the lower projecting end 28. Rocker element 30 contacts the curved surface through supporting ball 29 and is urged thereagainst in a manner not shown. A means, such as electromagnet 31, is provided whereby rocker element 30 can be disengaged from curve 26 of cam disc 25 upon excitation of the electromagnet 31.

In operation, as sensing arm 10 is pivoted in a clockwise direction about pivot 11, cam disc 25 likewise rotates in a clockwise direction causing the supporting ball 29 of rocker element 30 to slide along the curve 26, and relatively to the left of FIG. 2 due to the eccentricity of that curved surface will respect to pivot 11. Upon reaching its maximum excursion corresponding to the maximum lift of the cam, the force of the rocker element against the curved surface of the cam disk counteracts the force of spring 12 to prevent the sensing arm from returning or drawing back in an counter-clockwise direction as the cam continues to rotate. Therefore, the sensing arm remains in the maximum delfected position as shown in broken lines at 10' in FIG. 2. As can be seen in FIG. 2, in this position support pad 23 is entirely disengaged from intermediate lever 13.

If the sensing arm is to be returned to engagement with the cam profile to renew a sensing at the base diameter, electromagnet 31 is simply excited causing the rocker element 30 to raise from curve 26 so that the restoring force of spring 12 can return the sensing arm 10 into contact with the cam at pad 20 as is shown in FIG. 1.

Two devices according to the above-described invention may be used as a pair whereby cam sections of the workpiece aligned diametrically opposite one another can be sensed such that sensing is independent of any displacement in the devices. Also, the extreme dimension to be sensed is not limited to the base diameter of the cam, however, this is the dimension which will typically be sensed in the grinding of most modern camshafts.

Although, in the above description and the accompanying drawings, the present invention has been described in considerable detail, it is not intended that it be limited to such a description except as is necessitated by the appended claims.

I claim:

1. Apparatus for gauging one extreme dimension of a non-round workpiece comprising
    a sensing arm urged by a spring means against the contour of said non-round workpiece,
    a measuring feeler mechanism actuated by said sensing arm which is predeterminedly disposed to disengage from same upon a predetermined excursion of said sensing arm on said workpiece whereby total disengagement can be achieved if and when the actual dimension of said extreme dimension of said workpiece exceeds a desired value, and
    a releasable locking means for maintaining said sensing arm in said disengaged position by causing said sensing arm to separate from said workpiece upon reaching a maximum excursion.

2. The apparatus according to claim 1 wherein said sensing arm is pivotally mounted.

3. The apparatus according to claim 2 wherein said releasable locking means comprises
    a cam disc secured to project from one end of said sensing arm and having a curved bearing surface eccentrically disposed relative to the pivot of said pivotally mounted sensing arm such that the distance between said pivot and said curved surface increases toward the lower projecting end of said curved surface, and
    a releasable spring loaded rocker element urged against said curved surface of said cam disc and adapted to slide thereon upon rotation of said sensing arm away from the extreme dimension of said non-round workpiece upon the rotation thereof, and further adapted to counteract the force of said spring means urging said sensing arm against said workpiece except when released, such as by means of an electromagnet, whereby the sensing arm separates from the workpiece after achieving a maximum excursion.

4. The apparatus according to claim 1 wherein at least one transmission lever is provided between said sensing arm and said measuring feeler mechanism.

5. The apparatus according to claim 1 wherein said sensing arm is a two armed lever.

6. Apparatus for gauging one extreme dimension of a non-round workpiece comprising
    a two armed, pivotally mounted sensing arm urged by a spring means against the contour of said non-round workpiece,
    a measuring feeler mechanism actuated by said sensing arm which is predeterminedly disposed to disengage from same upon a predetermined excursion of said sensing arm on said workpiece whereby total disengagement is achieved if and when the actual dimension of said extreme dimension of said workpiece exceeds a desired value,
    at least one transmission lever having one arm disposed between said sensing arm and said measuring feeler,
    a cam disc secured to project from one end of said sensing arm and having a curved bearing surface eccentrically disposed relative to the pivot of said pivotally mounted sensing arm such that the distance between said pivot and said curved surface increases toward the lower projecting end of said curved surface, and
    a releasable spring loaded rocker element urged against said curved surface of said cam disc and adapted to slide thereon upon rotation of said sensing arm away from said extreme dimension of said non-round workpiece upon the rotation thereof, and further adapted to counteract the force of said spring means urging said sensing arm against said workpiece except when released, such as by means of an electromagnet, whereby the sensing arm separates from the workpiece after achieving a maximum excursion.

* * * * *